United States Patent
Taylor

(10) Patent No.: US 9,734,198 B2
(45) Date of Patent: Aug. 15, 2017

(54) QUERY PROCESSING

(75) Inventor: Owen Taylor, Waltham, MA (US)

(73) Assignee: Red Hat, Inc., Raleigh, NC (US)

( * ) Notice: Subject to any disclaimer, the term of this patent is extended or adjusted under 35 U.S.C. 154(b) by 1649 days.

(21) Appl. No.: 11/948,732

(22) Filed: Nov. 30, 2007

(65) Prior Publication Data

US 2009/0144258 A1  Jun. 4, 2009

(51) Int. Cl.
*G06F 17/30* (2006.01)

(52) U.S. Cl.
CPC .. *G06F 17/30442* (2013.01); *G06F 17/30489* (2013.01)

(58) Field of Classification Search
CPC .................................. G06F 17/30489
USPC .......................... 707/5, 102, 770
See application file for complete search history.

(56) References Cited

U.S. PATENT DOCUMENTS

| | | | | |
|---|---|---|---|---|
| 5,724,575 A * | 3/1998 | Hoover | ............ | G06F 17/30575 707/1 |
| 7,747,747 B1 * | 6/2010 | Arnold | ............ | H04L 41/26 709/223 |
| 8,543,700 B1 * | 9/2013 | Randall | ............ | G06F 17/30902 709/223 |
| 2004/0139101 A1 * | 7/2004 | Watanabe | ........ | G05B 19/4183 707/102 |
| 2006/0041560 A1 * | 2/2006 | Forman | ............ | G06F 17/30864 707/1 |
| 2006/0155857 A1 * | 7/2006 | Feenan et al. | ........ | 709/227 |
| 2008/0183699 A1 * | 7/2008 | Hu | ............ | G06F 17/30864 707/5 |

* cited by examiner

*Primary Examiner* — Chelcie Daye
(74) *Attorney, Agent, or Firm* — Lowenstein Sandler LLP

(57) ABSTRACT

Embodiments relate to systems and methods for online query processing, in which a SQL or other query server can generate a record of results served to clients. The distribution record of results, referred to as a distribution map, can record the identity of properties of database entries or other content that has been distributed to individual clients. When a client transmits a query whose results include properties that have already been served to that client, the re-transmission of that information can be suppressed leading to improved communications efficiency. A notification function can be provided whereby all users receive updates to the properties or content they have already received, when those data components have been updated in the underlying database. The delivered content can relate to personal contact lists, media play lists, or other information displayed in an application or Web service.

27 Claims, 8 Drawing Sheets

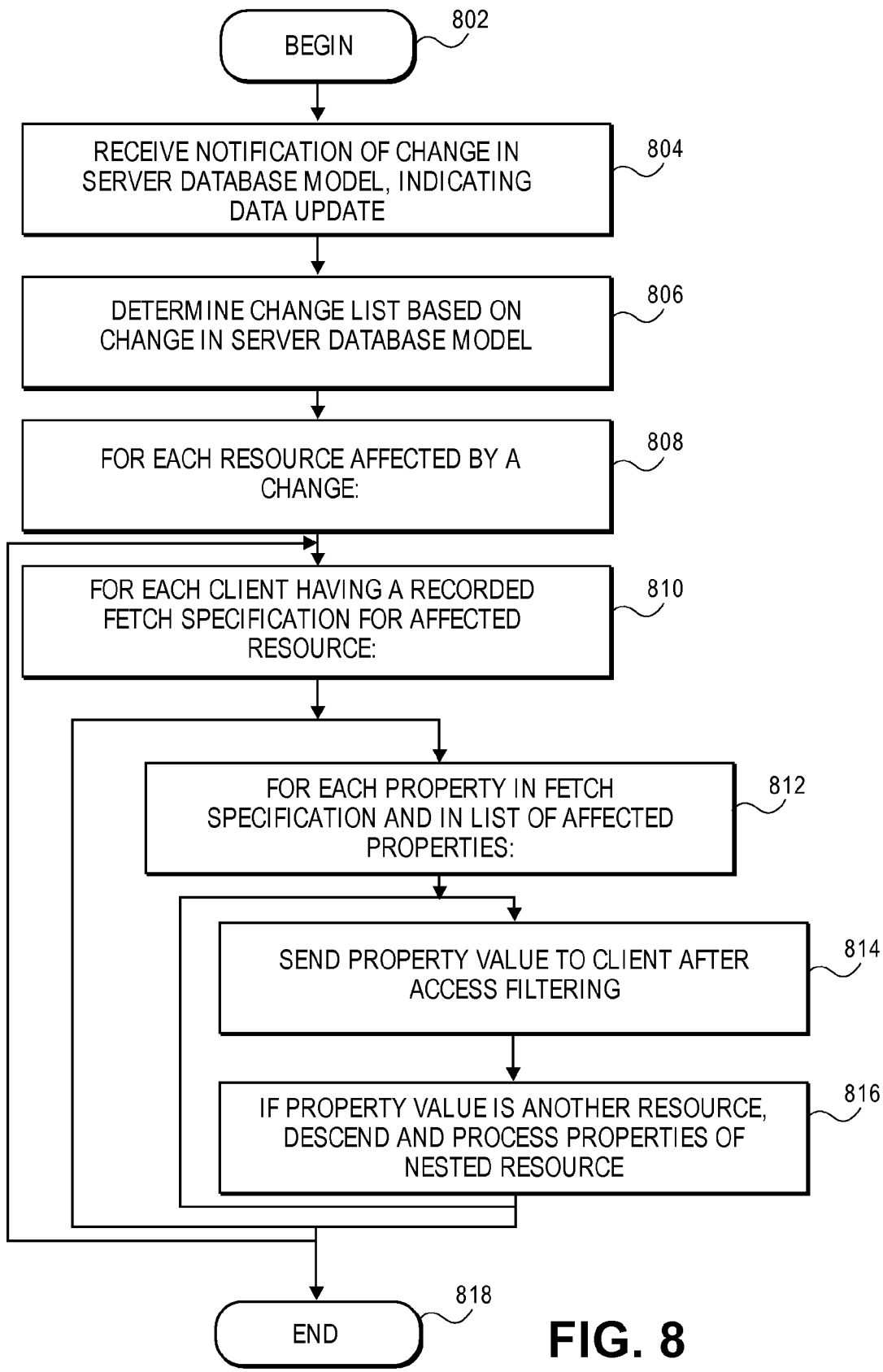

QUERY PROCESSING

FIELD

The present invention relates to systems and methods for query processing, and more particularly to platforms and techniques for serving responses to online queries based on a distribution map reflecting a user's history of received results.

BACKGROUND OF RELATED ART

Desktop applications such as messaging applications, media applications, social networking applications or others generally present users with an active display of content. A social networking application for example may present a user with a view of other users who are currently active. The list of active users can be retrieved from an online data service. The online data service typically retrieves contact lists or other information from a structured database, often hosted by a SQL (structured query language) server.

However, existing methods for providing the user with a representation of data or services delivered from a remote database involve drawbacks. For one, the programming interface between the application and server is not typically based on a general query protocol, but is instead hardwired between the application and server. Portability and extensibility of applications is therefore limited. For another, because updates to the data or service are queried from a SQL server, a new search transaction may be required to generate each refreshed view of the content. Polling with repeated queries involves an inherent tradeoff between the bandwidth and processing demands and the responsiveness that can be provided to the user. This tradeoff can make it difficult to dynamically maintain the user's displayed contact list, media list, or other information in real-time.

It has been known to implement online data services with a query cache, where a query against a SQL or other database is recorded and the results stored for future use. For example, the last 100 user queries can be cached by a SQL server. The results of those queries can be saved and served when the same query is later presented by the same or a different user.

Query-based caching also involves drawbacks, however. To provide an effective caching and achieve a high cache hit rate, the cached queries must be large-scale and cover a large amount of data; this means that clients will frequently receive more data than desired. In a social networking service, the cached data might include all of a user's contacts, when the application only wants information about currently active users. In addition, caching queries in the server can only reduce processing demands in the server; the bandwidth used between the client and, the server will be the same as if no caching is used. Finally caching queries in the server still involves a tradeoff between processing demands and responsiveness: as long as a cached result is used, no new data will be seen by the user. In order to see new data, the query must be re-executed.

It may be desirable to provide methods and systems for online query processing and data encapsulation that provide greater processing efficiency and flexibility.

DESCRIPTION OF THE DRAWINGS

The accompanying drawings, which are incorporated in and constitute a part of this specification, illustrate embodiments of the invention and together with the description, serve to explain the principles of the invention. In the figures:

FIG. 8 illustrates a flowchart of update change notification processing, according to various further embodiments.

DESCRIPTION OF EMBODIMENTS

Figure 1:
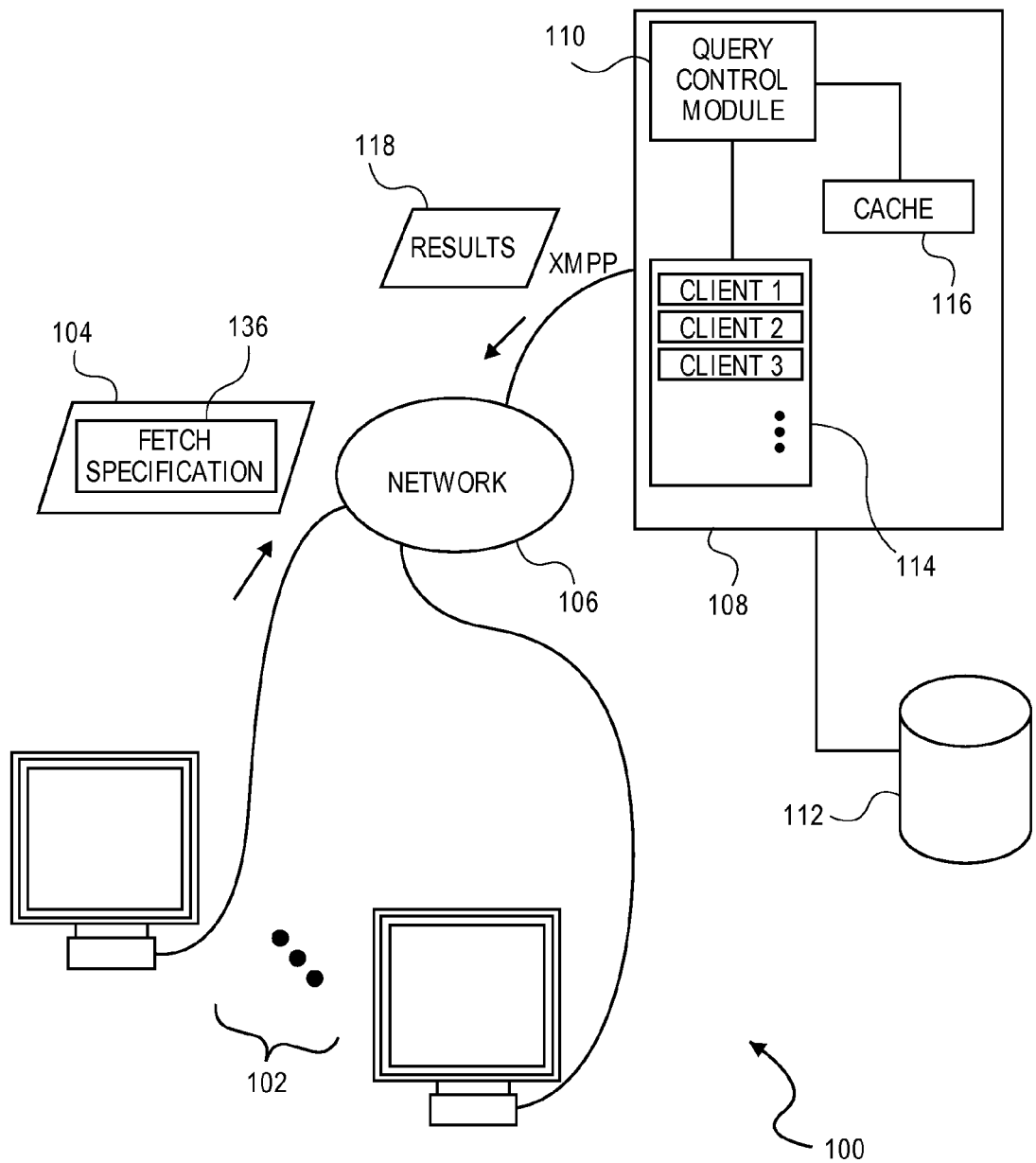
FIG. 1 illustrates an overall system for online query processing, according to various embodiments.

Embodiments of the present invention relate generally to systems and methods for query processing, in which a query server receives a query from one or more users, generates results from a database, and serves results to the requesting user. The query server tracks the distribution of the results to the user by generating a distribution map. The results that are served to requesting users are decomposed into resources, properties of those resources, or other constituent parts. The identity of each component of the results, along with the identity of the recipient of the results, are stored and tracked at a granular level in the distribution map. The clients retain all query results that the query server transmits to them. When the data previously retrieved in a query result changes, a notification message is sent to the client with the new data, and the client updates the retained query result. If a client requests duplicate information later, the query server avoids unnecessarily transmitting that information, because it is aware that the requesting client has already received the latest version of that information. Users making a later request for one or more components of the resources they are querying need not be served those results, since their application has already received those components and the query logic is aware of the delivery of that information to the corresponding client.

Redundant or unnecessary queries against the underlying database as well as retransmission of identical results are all avoided. Search loads on the query server can be significantly reduced. This monitoring of the state of results populating the requesting client results in a type of protocol compression, saving bandwidth and improving application responsiveness. Updates to personal contact lists, personal media play lists, or other resources are limited to changed components of query results. All users can therefore transparently receive only necessary incremental updates to individual components in the results they have received over time. A seamless coupling between queries and later update notifications is therefore established and maintained.

As described above, when updates to any components of results delivered to clients takes place in the underlying database, those updated components are automatically transmitted to clients that have received those components in the past. When a user transmits a query, that request therefore implicitly represents a request for future notification of changes to the desired data. In addition to keeping the client and server copies of data synchronized, these notification messages provide a mechanism for applications to immediately refresh data displayed to the user without having to poll the server.

When an update to a particular data component is detected in the underlying SQL database, query logic can detect that change and identify which clients have previously received that component as recorded in the distribution map. That set of clients can then automatically receive an update to those components they are "listening to." The updating can take place in real-time or near real-time, delivering a more robust and timely experience to the user. The delivery of content or services can also thereby be transformed to an effective subscription basis, rather than a conventional "pull" model that depends more strictly on query transactions to generate updates.

More particularly, in embodiments users can operate a set of clients, such as personal computers, to communicate with a query server coupled to a database. The database stores multiple objects or resources, each of which can contain a set of one or more properties or other components.

The user can transmit a query from the client to the query server, including a request to identify or fetch a set of specific properties from a defined set of resources from the database. The query can specify, for example, that the contact list property should be extracted from the resource corresponding to a particular user. The returned property values are a set of resources corresponding to users in the contact list. The query can further specify that for each of these returned resources, the name and email address properties should be fetched. The query server can execute a search against the database to generate a set of hits or results, including resources or properties of those resources matching the fetch specification contained in the query. The set of results can be transmitted to the client operated by the user making the request or receiving an update (which may be referred to as the "requesting client" or "client" herein).

A query control module in the query server can track and store the properties or other content served to the client. The query control module generates a distribution map that records the identity of properties or other content stored in the database that have been transmitted to the set of clients, which clients have received them, and when those results were delivered. Clients which had received results containing the updated properties or other content can automatically be served updates to that data, without a need to request that updated information.

Reference will now be made in detail to exemplary embodiments of the invention, which are illustrated in the accompanying drawings. Where possible the same reference numbers will be used throughout the drawings to refer to the same or like parts.

FIG. 1 illustrates an overall system 100 consistent with embodiments of the present invention, in which a set of clients 102 can transmit one or more query 104 containing a fetch specification 136 to a query server 108 via network 106, and receive results 118 in response. Each client in the set of clients 102 can for instance be a personal computer, network-enabled cellular telephone, media player, or personal digital assistant. The network 106 can be or include the Internet, or other public or private networks or connections. The query server 108 can be coupled to a database 112. The database 112 can be an SQL database, or other database or data store. The query server 108 can host or maintain components including a query control module 110, a cache 116, and a distribution map 114. The query server 108 can host or support a Web service or application, such as a social networking application, messaging application, email application, or other service or application. Results 118 generated by query server 108 can be serialized in XML (extensible markup language) and transmitted to the requesting client via XMPP (extensible messaging and presence protocol), or other protocol or channel.

In terms of query processing, in general, query server 108 can receive query 104 and embedded fetch specification 136, and perform a search against database 112 and/or cache 116 to match stored resources and/or properties to generate results 118. In embodiments the query 104 and fetch specification can be in SQL format. For example, an SQL query can take the form:

SELECT name, title FROM Employee WHERE salary>100000.

The fetch specification 136 in the example noted corresponds to the SELECT clause shown—"name, title." The fetch specification in one regard specifies what properties to select or retrieve from the set of resources resulting from matches to the query 104. The remainder of the query 104, namely the "FROM clause" and "WHERE clause", correspond to the query name and query parameters of a data model query according to embodiments herein. The query name and query parameters determine what resources appear in results 118. This other component of query 104 can be referred to as a "resource specification." Search processing according to embodiments herein differs from a standard SQL query in one regard that query 104 can reference other resources in the fetch specification 136. According to embodiments, the example above could be modified to take the form:

SELECT name, title, manager.[name,title] FROM Employee WHERE salary>100000.

This expression would mean that as well as the "name" and "title" properties of the matched employee resource, the query server 108 should also return the "name" and "title" properties from the resource referenced by the "manager" property of the employee resource. Fetch specification 136 plays the role of determining the content that gets stored in the distribution map 114. The set of properties 130 or other content that is registered to distribution map 114 in turn defines the content which will be updated to the set of clients 102. The set of properties 130 or other content is automatically transmitted to those clients 102 which have specified that content in a prior query 104. In embodiments, distribution map 114 can store the identity of the properties designated in fetch specification 136, rather than the data that was actually transmitted. In such embodiments, if one of clients 102 requests a property that does not yet exist but is later added, that client can receive that property and its updates when added to database 112.

The first time a resource or property is retrieved and distributed from database 112 to a requesting client, that data can be stored to cache 116. Cache 116 generally consists of faster storage or retrieval resources than the overall database 112. Future requests for the same information can be served from cache 116 instead of database 112.

Query server 108 performs processing to record and monitor the distribution of results 118 to the set of clients 102, to permit more efficient and more granular online query processing. In embodiments, query control module 110 contained in query server 108 can access and update distribution map 114 to record the set of properties 130 or other content that has been produced in a set of results 118 and transmitted to the set of clients 102. In general, upon receipt of query 104, query control module 110 can begin by transmitting the resource specification contained in query 104 to database 112. Database 112 returns a set of resources 128 to query control module 110 representing resources that match the resource specification (e.g., "Employee WHERE Salary>100000"). This processing occurs on every query 104, before any fetching begins or any properties contained in resources are examined.

Fetch specification 136 can then be examined to identify any matches in set of properties 130 contained in the identified set of resources 128. Any time a query 104 and embedded fetch specification 136 results in one or more properties or other content being retrieved from database 112 and/or cache 116, the identity of that information is recorded in distribution map 114. Query control module 110 also records the identity of the client (or user) in the set of clients 102 that received the results 118 incorporating matching properties or other content in distribution map 114.

When a new query 104 is received from the same client in the set of clients 102 requesting a resource or property in fetch specification 136, query control module 110 can determine whether the requested information has already been received by client 102. Communications using distribution map 114 can represent a stateful protocol that registers a persistent connection to a client. Distribution map 114 can maintain an internal identifier recording a particular connection to a client. When that connection is closed, entries for that connection and its associated client are removed from distribution map 114. Query control module 110 can decompose incoming query 104 to extract fetch specification 136, and identify the corresponding set of properties 130 being requested. Query control module 110 can check distribution map 114 to determine whether the subject set of properties 130 have been previously requested and/or delivered to the requesting client. Query control module 110 can then determine whether the set of properties 130 already delivered to the requesting client correspond to the most recent version of the set of properties 130 residing in database 112 and/or cache 116. If the requesting client is already in possession of the most recent version of the set of properties 130 identified by fetch specification 136, the client can be notified that the results 118 are already reflected in the data the client has received. The application can then use that information to present the associated contact list, media play list, or other resources or content to the user in immediate fashion.

If the member of clients 102 presenting query 104 is not already in possession of the most current version of set of properties 128 or other content corresponding to the fetch specification 136, query control module 110 can execute a search against database 112 and/or cache 116 to generate results 118. The fetch specification 136 of query 104 is then applied to each of the returned set of resources 128. If the set of properties 130 enumerated in fetch specification are already contained in cache 116, query control module 110 extracts the matching set of properties 130 from cache 116. If not, query control module 110 performs a search or lookup against database 112 to extract the set of properties 130 specified by fetch specification 136 from database 112. Query control module 110 then transmits the matching set of properties 130 as results 118 to the requesting client. Query control module 110 then updates cache 116 to add the set of properties 130 contained in newly-transmitted results 118. Cache 116 thereby registers and stores versions of the set of properties 130 that are served to clients 102. Later queries from different clients requesting the same properties can receive that data directly from cache 116, without a need for a full search against database 112. Cumulative retrieval activity can therefore boost the cache hit ratio of the query processing system. It will be appreciated that in embodiments, database 112 can operate without a cache 116.

As noted, the query control module 110 can also access the distribution map 114 and provide automatic or rolling updates to clients who had previously requested individual properties, based on a notification message containing the properties have been updated in database 112 and/or cache 116. In embodiments, individual users/clients can choose to subscribe or unsubscribe to updates to selected properties or resources.

Figure 2:
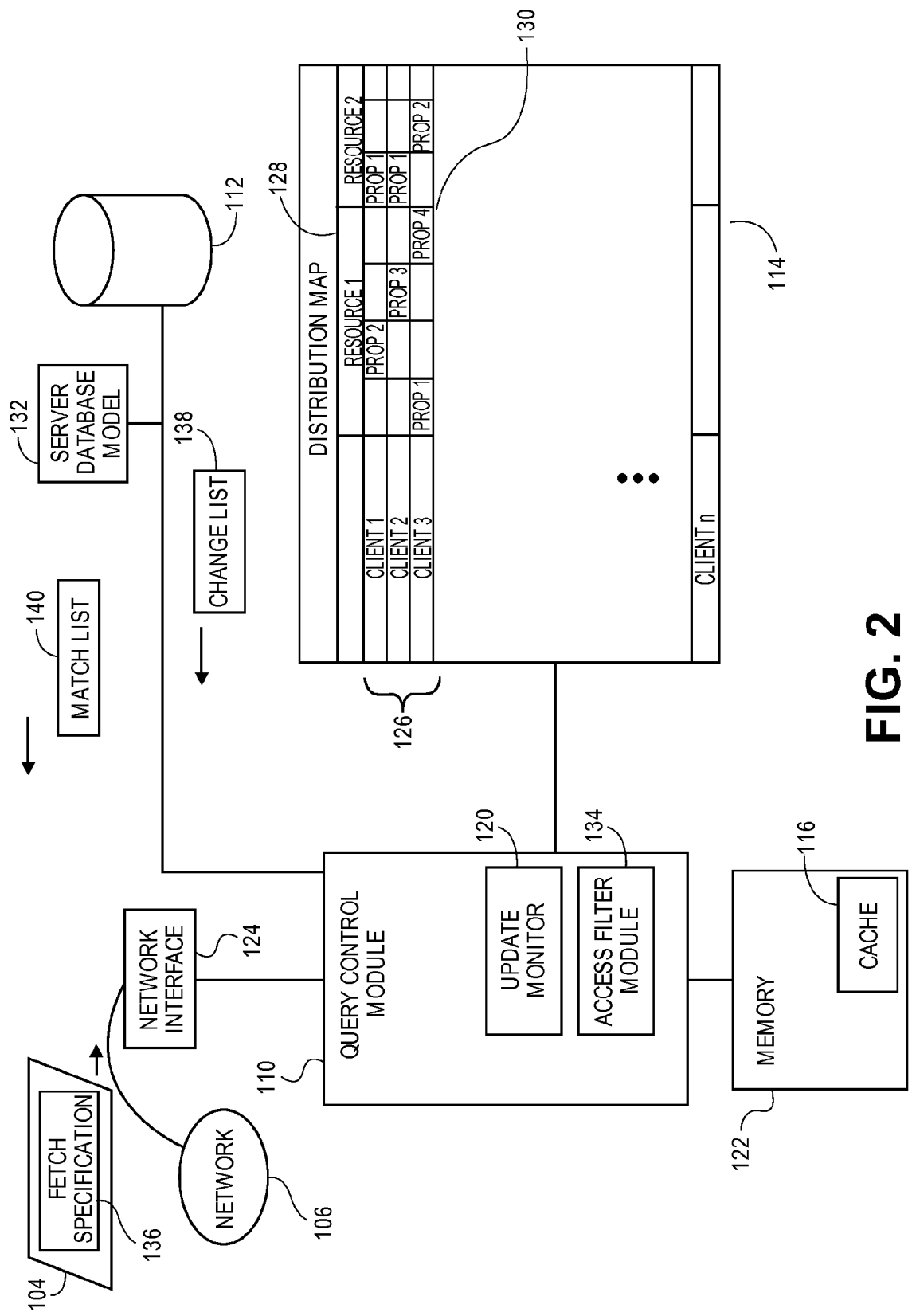
FIG. 2 illustrates a configuration of a query control module, according to various embodiments.

In terms of network configurations, as shown in FIG. 2, query control module 110 can illustratively connect to network 106 via a network interface 124, such as an Ethernet connection, wireless data link, or other link or connection to communicate with set of clients 102 (not shown). Query control module 110 also communicates with memory 122, for example electronic memory such as random access memory (RAM). Cache 116 can reside in memory 122.

Query control module 110 can contain or host various resources, including an update monitor 120 and a filter module 134 as shown. Update monitor 120 can communicate with a server database model 132 that reflects the current state of all the data components stored in database 112. Filter module 134 can contain a set of access filters or policies to control what data is permitted to be transmitted to individual clients in the set of clients 102. For example, certain clients may be permitted to receive only a restricted set of another client's contact list, or a clients email address can configured to be blocked from distribution to any other client. Other filters are possible. Query control module 110 can invoke filter module 134 when results 118 are generated to control the distribution of that data.

In terms of populated data, database 112 can store or host a variety of data types and components, arranged in different formats. In various embodiments, database 112 can store a set of resources 128. Each resource in the set of resources 128 can comprise a set of properties 130. Each resource in the set of resources 128 can represent or encapsulate a high-level data object, such as information about a particular user. Another example of a resource is a media play list for a user, or an online transaction record for a client or user at Web shopping sites.

Each resource can contain or link to a set of properties 130, located at a lower hierarchical level than the resource. The set of properties 130 can represent various attributes of the resource. In the case of a resource that comprises information about a user, the set of properties 130 can include the user's name, address, and contact list, as well as other fields or information. In embodiments, a property in the set of properties 130 for a given resource can itself comprise another resource. Different resources in the set of resource 128 can have the same enumerated set of properties 130, or can have a different set of properties 130.

In terms of query processing, when query control module 110 receives query 104 including any fetch specification 136 to database 112 to run a search or generate a report, query control module 110 can first determine whether the property requested in fetch specification 136 resides in cache 116. If it does, the query control module 110 can extract the matching property from database 112 or cache 116 to build results 118. If cache 116 does not contain the requested property, query control module 110 can transmit the fetch specification 136 to database 112 to run a SQL query against the data stored in database 112.

The database 112 returns a match list 140 to the query control module 110 that enumerates properties or other content matching the fetch specification 136 of query 104.

After extracting hits from cache 116 and/or database 112, the query control module 110 can check the distribution map 114 to determine whether any of the data in the match list 140 has already been served to the requesting client. If so, query control module 110 removes that data from the results 118. Query server 108 then transmits or serves the results 118 to the requesting client Query control module 110 then updates cache 116 to store the properties or other content served in results 118, and updates distribution map 114 to reflect the distribution of that information to the requesting client.

Figure 3:
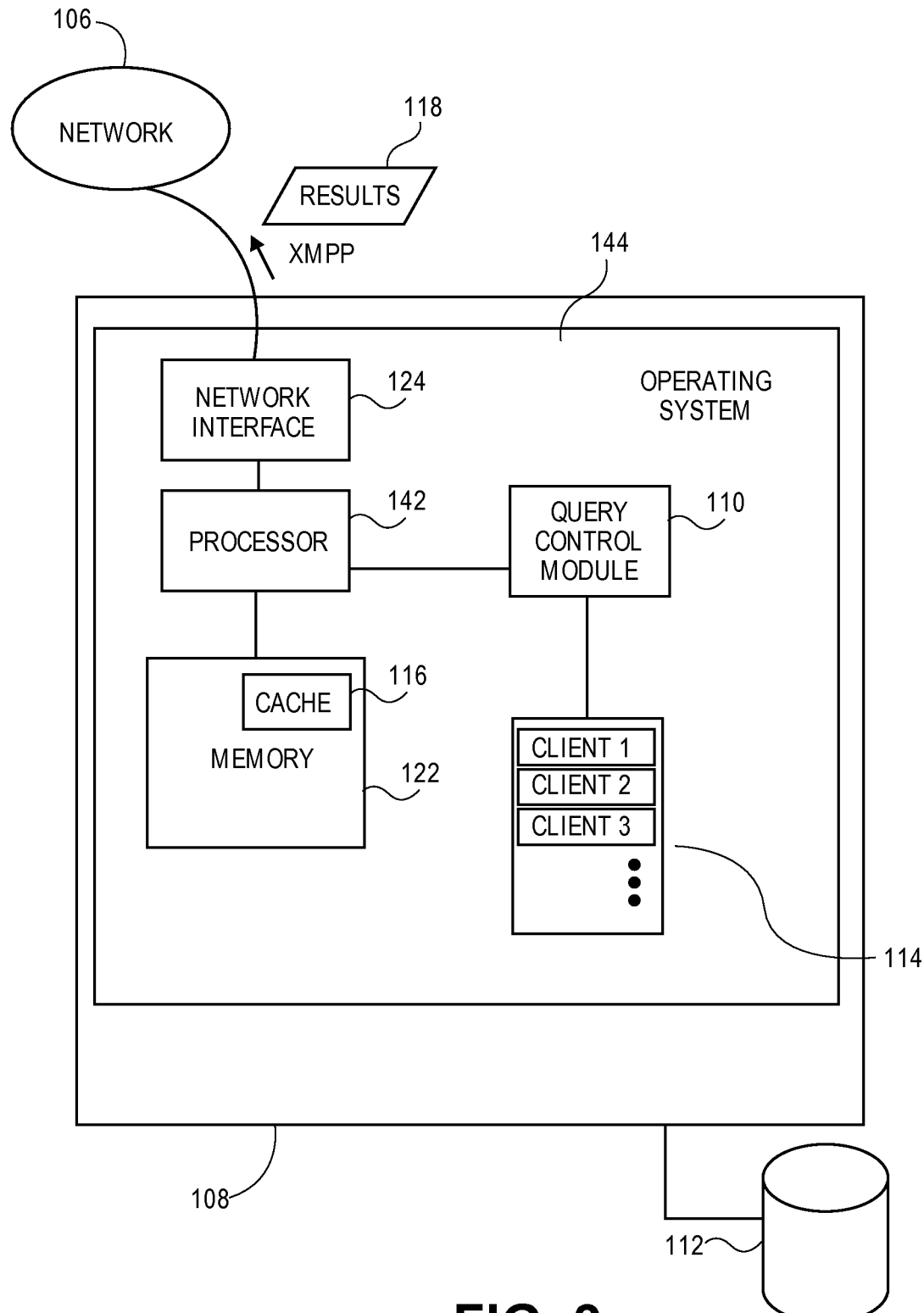
FIG. 3 illustrates a hardware diagram of a query server configured to execute query processing, according to various embodiments.

As shown in FIG. 3 the query control module 110 and associated resources can also generate transparent updates to the results 118 served to clients, without intervention by the clients. More particularly, when a resource, property, or other data item is updated in database 112, database 112 can generate a change list 138 and transmit that list to query control module 110. Update monitor 120 of query control module 110 detects the change list 138 and identifies the properties, or other data items that have changed as reflected in that list. In embodiments, distribution map 114 can record a version number of resources and properties that are distributed to clients 102 in client profile list 126. Query control module 110 can compare those versions to updated version numbers of the same resources and properties reflected in change list 138. Query control module 110 then identifies clients in the set of clients 102 that have previously received or are "listening to" the updated resource or property.

Query control module 110 can then automatically transmit new results 118 incorporating those updated resources or properties to the corresponding clients. In this manner, clients in set of clients 102 which have received results based on desired resources or properties can automatically and continuously receive refreshed versions of those objects. These updates can be automatically broadcast without intervention or further queries by the client or user. Thus for example, a client which has requested and received the contact list of another client can automatically continue to receive updated versions of that contact list. A client which has requested and received the media download record of another client, can automatically receive updated lists showing the latest media downloads by that other client. Other content or services can be updated. In embodiments, a client that has requested and received desired results 118 can choose to unsubscribe from future updates to the delivered data.

FIG. 3 illustrates a hardware diagram of a query server 108 configured to execute query processing, according to various embodiments. Query server 108 can comprise a processor 142 communicating with memory 122 and network interface 124. Network interface 124 connects to network 106, such as the Internet. Processor 142 can be a microprocessor, microcontroller, or other general-purpose or special-purpose processor, or other programmable logic device. Cache 116 can be hosted in memory 122. Query control module 110 can communicate with processor 142 to control and manage various query functions. Query control module 110 can in embodiments be programmed or hosted in processor 142, or can be a separate processor or logic device. Query server 108 can run an operating system 144. Operating system 144 can be an open-source operating system such as a Linux™-based platform, or a proprietary operating system. Software, applications, and logic executed on processor 142 can operate under control of operating system 144. Operating system 144 can provide support to the software, hardware, communications, and logic operating on query server 108, including for instance to store and retrieve files, perform I/O (input/output) operations, and generate and present a user interface such as a graphical user interface to a user. Query control module 110 can generate the distribution map 114 tracking and controlling the delivery of results 118 and components of results 118 to various users or clients, as described herein.

Figure 4:
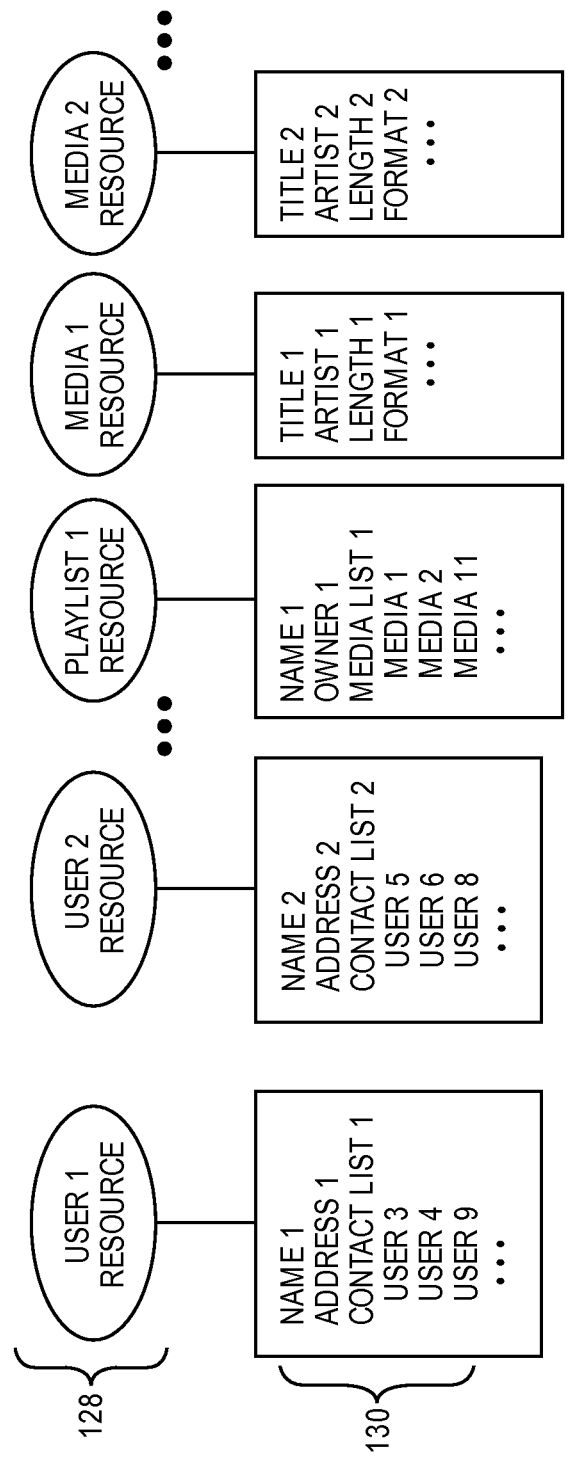
FIG. 4 illustrates a data structure of stored resources, according to various embodiments.

In terms of the data structure used to represent query information and responses, database 112 and/or results 118 can store information comprising a set of resources 128. As shown in FIG. 4, the set of resources 128 can comprise an object-oriented data schema. In that configuration, individual resources or other high-level objects are broken down into a set of properties or attributes. More particularly, in embodiments the set of resources 128 can comprise a set of discrete high-level data objects or constructs, such as information about a particular user, or a media play list. Each resource in the set of resources 128 can encapsulate, link, or point to a set of properties 130. The set of properties 130 can be or include, for example, a set of individual user identities stored in a contact list, or a set of individual media objects stored in a media play list, such as songs or videos. The set of properties 130 for two different resources can be the same, different, or overlap.

Each property in the set of properties 130 for each resource can be or include specific data fields or values, for example, the name, email address, telephone number, and other information for an identified user. The set of properties 130 can be or include, for further example, fields or values such as the title, source, length, and other information for video, music, or other media downloads identified in a media play list. Each property can comprise a set of multiple property values 146, such as a list or tree of contacts in a contact list or songs in a play list. Other resources, properties, and property values can be used.

Figure 5:
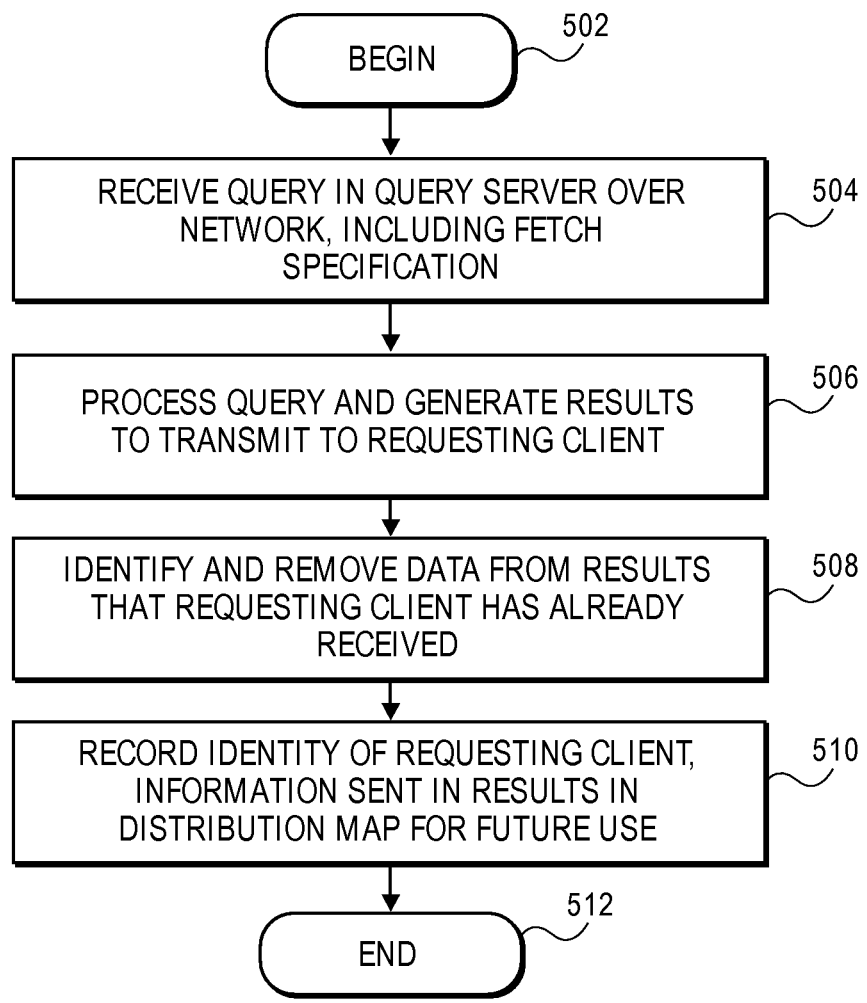
FIG. 5 illustrates a flowchart of query processing, according to various embodiments.

FIG. 5 illustrates overall query processing, according to embodiments. In step 502, processing can begin. In step 504, query server 108 receives a query 104, including a fetch specification 136, over network 106 from a client in set of clients 102. In step 506, query server 108 processes the query 104 to generate results 118 to transmit back to the requesting client. In step 508, query server 108 can remove any data components contained in results 118 that the requesting client has already received and that remain current. This removal can assist in enhancing or optimizing query processing, since unnecessary processing is avoided. In step 510, query server 108 can record the identity and/or the content of the results 118 in distribution map 114 for future use. In step 512, processing can repeat, return to a prior processing point, jump to a further processing point, or end.

Figure 6:
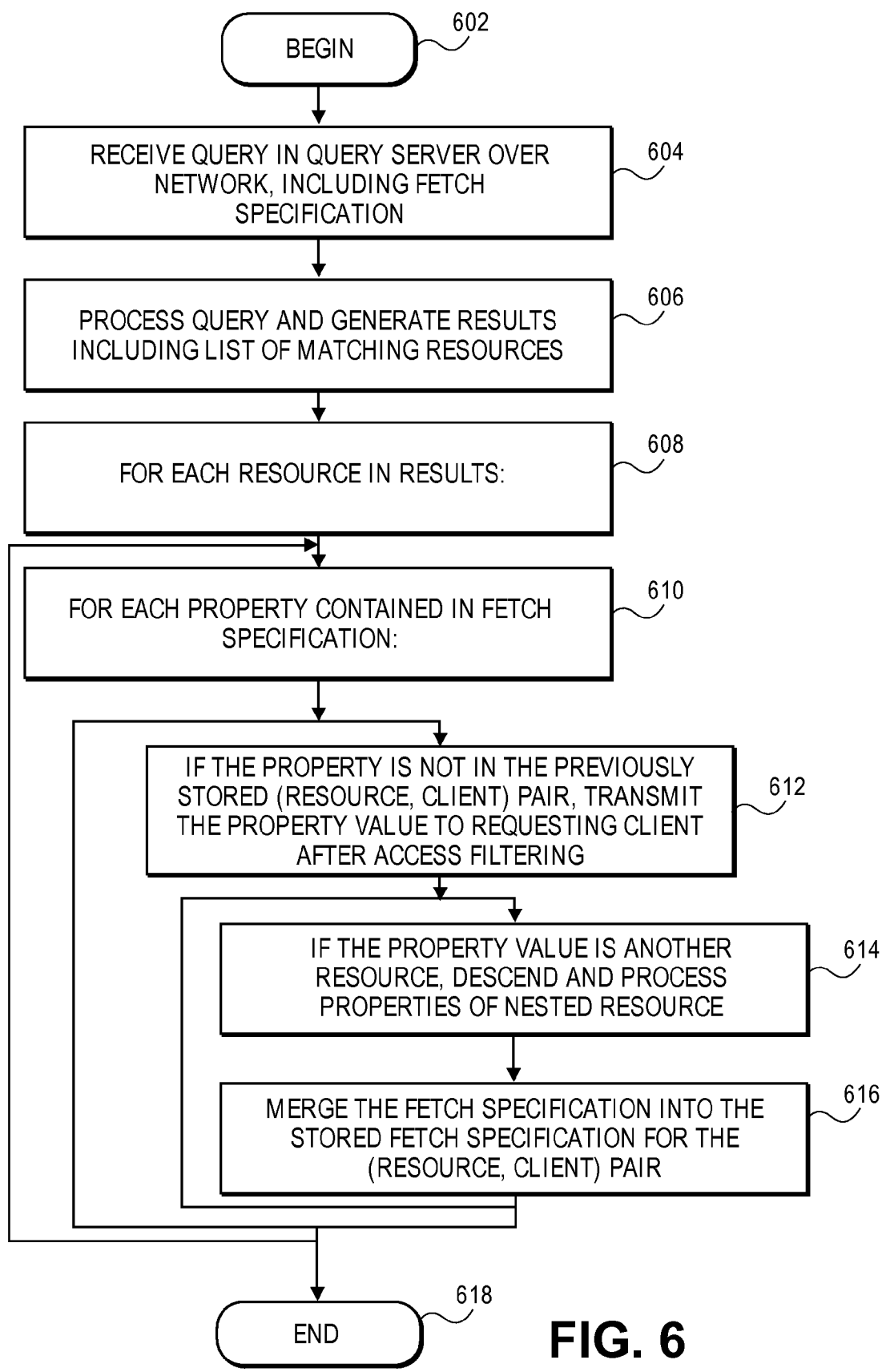
FIG. 6 illustrates a flowchart of query processing, according to various further embodiments.

FIG. 6 illustrates a flowchart of query processing, according to further embodiments. In step 602, processing can begin. In step 604, query server 108 receives a query 104, including a fetch specification 136, over network 106 from a client in set of clients 102. In step 606, query server 108 generates a match list 140 enumerating the resources that match query 104.

In step 608, query control module 110 can execute a loop 610 for each resource in match list 140. In loop 610, for each property in the fetch specification 136, in step 612 a determination is made whether the property is in the previously stored fetch specification 136 for the subject (resource, client) pair. If not, the property value is sent to the requesting client after filtering by filter access module 134. If the property is in the previously stored fetch specification 136 for the subject (resource, client) pair, the property value can be omitted from results 118 since the requesting client has already received that data.

In each loop of step 610, a determination is also made in step 614 by query control module 110 whether the property value is another resource. That is, it is determined whether a second resource is a property of a first resource, in nested fashion. If so, then processing descends to the second resource and the properties of the second resource are processed. If not the loop proceeds without descending to lower resource levels. After examining properties of any nested resources, in step 616 the fetch specification 136 currently being processed is merged or added to the stored fetch specification information for the (resource, client) pair. The loop of step 608 then terminates when the last resource associated with match list 140 is processed. In step 618, processing can repeat, return to a prior processing point, jump to a further processing point, or end.

Figure 7:
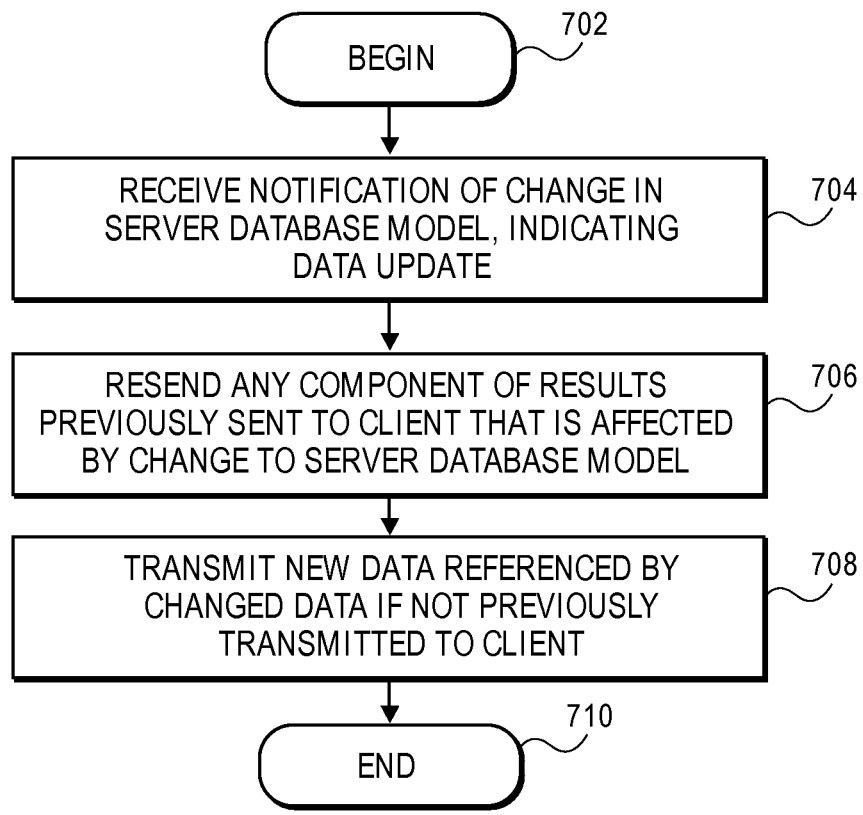
FIG. 7 illustrates a flowchart of update change notification processing, according to various embodiments.

FIG. 7 illustrates overall change notification and update processing, according to embodiments. In step 702, processing can begin. In step 704, query server 108 can receive notification that a change to the image of the database 112 reflected server database model 132 has occurred, indicating an update or change to one or properties or other content stored in database 112. In step 706, query server 108 can automatically resend any resource, property, or other component of results 118 that has been previously sent to a client that is affected by the change to server database model 132. In embodiments, only the incremental change or delta in the resource, property, or other information can be resent, to enhance or optimize update efficiency. In step 708, any new data referenced by the changed server database model 132 can be sent to one or more client in set of clients 102, if not transmitted before. In step 710, processing can repeat, return to a prior processing point, jump to a further processing point, or end.

FIG. 8 illustrates change notification and update processing, according to further embodiments. In step 802, processing can begin. In step 804, query server 108 receive notification of a change to the image of database 112 in server database model 132, indicating an update or change to one or more properties or other content stored in database 112. In step 806, query control module 110 generates a change list 138 enumerating the properties or other content that is affected by the change to server database model 132. In step 808, a loop can be executed for each affected resource associated with a changed property. In that loop, in step 810, a second loop can be executed for each client having a recorded fetch specification 136 associated with the affected resource. In the loop of step 810, a further loop can be executed in step 812 for each property in the fetch specification 136 and in the list of affected properties, in which in step 814 the property value is sent to the client after filtering by access filter module 134. A determination is then made in step 816 by query control module 110 whether the extracted property value consists of another resource. That is, it is determined whether a second resource is a property of a first resource, in nested fashion. If so, then processing descends to the second resource and the properties of the second resource are processed. If not the loop proceeds without descending to lower resource levels. The set of loops initiated at step 808 then terminates when the last resource affected by change list 138 is processed. In step 818, processing can repeat, return to a prior processing point, jump to a further processing point, or end.

The foregoing description is illustrative, and variations in configuration and implementation may occur to persons skilled in the art. For example, while embodiments have been described in terms of multiple clients transmitting queries to a single query server 108, in embodiments multiple query servers can receive queries and perform query processing on a coordinated basis. Similarly, while embodiments have been described in terms of performing queries against a single database 112, in embodiments multiple databases or data stores can host the search data. For example, a set of resources 128 can be generated by performing a search against a first database, then individual properties of the set of resources 128 can be variously retrieved from Web services or other databases. Once an individual album has been identified as a property in a play list resource, for instance, a price for that album can be retrieved from an online music store. Other resources described herein as singular or integrated can in embodiments be plural or distributed, and resources described as multiple or distributed can in embodiments be combined. The scope of the invention is accordingly intended to be limited only by the following claims.

What is claimed is:

1. A method comprising:
 receiving, by a processor, a query from a client requesting a resource and a property of the resource;
 determining, by the processor, whether the property of the resource resides in a data store; and
 in response to determining that the property of the resource resides in the data store:
  querying the data store to identify the resource that matches the query from the client and a value for the property of the resource;
  tracking the value for the property and a record of clients that have received a current instance of the value for the property in a distribution map in the data store, the distribution map comprising an indication of a stateful protocol that registers a connection to the client;
  examining the distribution map to determine whether the client has already received the current instance of the value for the property from the data store; and
  suppressing a transmission of the current instance of the value for the property when the client has already received the current instance in view of the examining the distribution map.

2. The method of claim 1, further comprising retrieving the current instance of the value for the property from the data store when the client has not already received the current instance of the value for the property.

3. The method of claim 2, further comprising transmitting the current instance of the value for the property to the client.

4. The method of claim 3, further comprising updating the distribution map in response to transmitting the current instance of the value for the property.

5. The method of claim 1, further comprising receiving a notification for an updated instance of the value for the property from the data store.

6. The method of claim 5, further comprising automatically transmitting the updated instance of the value for the property to clients having a record of receiving the property in the distribution map.

7. The method of claim 5, further comprising presenting a user dialog to select to subscribe or unsubscribe to the notification.

8. The method of claim 1, wherein the query comprises a fetch specification specifying the property of the resource.

9. The method of claim 1, wherein the data store comprises a database.

10. A query server, comprising:
a processor to communicate with a client through a first interface and with a data store through a second interface, and
a memory operatively coupled to the processor, the processor to:
receive a query from the client requesting a resource and a property of the resource;
determine, by the processor, whether the property of the resource resides in the data store; and
in response to determining that the property of the resource resides in the data store:
query the data store to identify the resource that matches the query and a value for the property of the resource;
track the value for the property and a record of clients that have received a current instance of the value for the property in a distribution map in the data store, the distribution map comprising an indication of a stateful protocol that registers a connection to the client;
examine the distribution map to determine whether the client has already received the current instance of the value for the property from the data store; and
suppress a transmission of the current instance of the value for the property when the client has already received the current instance in view of examining of the distribution map.

11. The query server of claim 10, wherein the query server is further to retrieve the current instance of the value for the property from the data store when the client has not already received the current instance of the value for the property.

12. The query server of claim 11, wherein the query server is further to transmit the current instance of the value for the property to the client.

13. The query server of claim 12, wherein the query server is further to update the distribution map in response to transmitting the current instance of the value for the property.

14. The query server of claim 10, wherein the query server is further to receive a notification for an updated instance of the value for the property from the data store.

15. The query server of claim 14, wherein the query server is further to automatically transmit the updated instance of the value for the property to clients having a record of receiving the property in the distribution map.

16. The query server of claim 14, wherein the query server is further to receive input from a user dialog to select to subscribe or unsubscribe to the notification.

17. The query server of claim 10, wherein the query comprises a fetch specification specifying the property of the resource.

18. The query server of claim 10, wherein the data store comprises a database.

19. A non-transitory computer-readable storage medium comprising instructions to cause a processor to:
receive, by the processor, a query from a client requesting a resource and a property of the resource;
determine, by the processor, whether the property of the resource resides in a data store; and
in response to determining that the property of the resource resides in the data store:
query the data store to identify the resource that matches the query and a value for the property of the resource;
track the value for the property and a record of clients that have received a current instance of the value for the property in a distribution map in the data store, the distribution map comprising an indication of a stateful protocol that registers a connection to the client;
examine the distribution map to determine whether the client has already received the current instance of the value for the property from the data store; and
suppress a transmission of the current instance of the value for the property when the client has already received the current instance in view of examining the distribution map.

20. The non-transitory computer-readable storage medium of claim 19, wherein the processor is further to retrieve the current instance of the value for the property from the data store when the client has not already received the current instance of the value for the property.

21. The non-transitory computer-readable storage medium of claim 20, wherein the processor is further to transmit the current instance of the value for the property to the client.

22. The non-transitory computer-readable storage medium of claim 21, wherein the processor is further to update the distribution map in response to transmitting the current instance of the value for the property.

23. The non-transitory computer-readable storage medium of claim 19, wherein the processor is further to receive a notification for an updated instance of the value for the property from the data store.

24. The non-transitory computer-readable storage medium of claim 23, wherein the processor is further to transmit the updated instance of the value for the property to clients having a record of receiving the property in the distribution map.

25. A method comprising:
identifying, by a processor, a distribution map recording a transmission, to a set of clients, of query results comprising values for a set of properties;
tracking the values for the set of properties and a record of clients that have received a current instance of a value for a property of the set of properties in the distribution map in a data store, wherein the distribution map identifies clients that have received a current instance of each of the values for each of the set of properties from the data store, and the distribution map comprises an indication of a stateful protocol that registers a connection to a client;
receiving a notification from the data store for an updated instance of the value for the property of the set of properties;
determining, by the processor, whether the property of the set of properties resides in the data store; and
in response to determining that the property of the set of properties resides in the data store:
transmitting the updated instance of the value for the property to at least one client of the set of clients requesting the property as recorded in the distribution map; and
suppressing a transmission of the updated instance of the value for the property when the at least one client has already received the current instance.

26. The method of claim 25, wherein the set of properties is associated with at least one resource.

27. The method of claim 26, further comprising presenting the updated instance of the value for the property on the at least one client via an application.

\* \* \* \* \*